US012298654B2

(12) United States Patent
Sueyoshi et al.

(10) Patent No.: US 12,298,654 B2
(45) Date of Patent: May 13, 2025

(54) PROJECTION APPARATUS, PROJECTION SYSTEM, PROJECTION METHOD, AND PROGRAM

(71) Applicant: SONY GROUP CORPORATION, Tokyo (JP)

(72) Inventors: Masahiro Sueyoshi, Tokyo (JP); Yuji Hiura, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 939 days.

(21) Appl. No.: 17/430,196

(22) PCT Filed: Feb. 4, 2020

(86) PCT No.: PCT/JP2020/004010
§ 371 (c)(1),
(2) Date: Aug. 11, 2021

(87) PCT Pub. No.: WO2020/170788
PCT Pub. Date: Aug. 27, 2020

(65) Prior Publication Data
US 2022/0155665 A1    May 19, 2022

(30) Foreign Application Priority Data

Feb. 18, 2019    (JP) .................................. 2019-026702

(51) Int. Cl.
*G03B 21/26*    (2006.01)
*G03B 21/20*    (2006.01)

(52) U.S. Cl.
CPC ........... *G03B 21/26* (2013.01); *G03B 21/206* (2013.01); *G03B 21/2033* (2013.01)

(58) Field of Classification Search
None
See application file for complete search history.

(56) References Cited

U.S. PATENT DOCUMENTS

2020/0043154 A1*   2/2020   Miyoshi .................. G09F 27/00

FOREIGN PATENT DOCUMENTS

| JP | 2000-122972 A | 4/2000 |
|---|---|---|
| JP | 2008-234621 A | 10/2008 |
| JP | 2012-141856 A | 7/2012 |
| JP | 2013-036278 A | 2/2013 |
| JP | 2016-038706 A | 3/2016 |

\* cited by examiner

*Primary Examiner* — Bao-Luan Q Le
*Assistant Examiner* — Danell L Owens
(74) *Attorney, Agent, or Firm* — Paratus Law Group, PLLC

(57)    ABSTRACT

A projection apparatus of the present technology includes a control unit and a projection unit. The control unit generates a data pattern on the basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus. The projection unit projects an identifier based on the data onto a projection target.

18 Claims, 7 Drawing Sheets

PROJECTION APPARATUS, PROJECTION SYSTEM, PROJECTION METHOD, AND PROGRAM

CROSS REFERENCE TO PRIOR APPLICATION

This application is a National Stage Patent Application of PCT International Patent Application No. PCT/JP2020/004010 (filed on Feb. 4, 2020) under 35 U.S.C. § 371, which claims priority to Japanese Patent Application No. 2019-026702 (filed on Feb. 18, 2019), which are all hereby incorporated by reference in their entirety.

TECHNICAL FIELD

The present technology relates to a projection apparatus, a projection system, a projection method, and a program. Specifically, the present technology relates to a technique for reading an identifier projected by a projection apparatus and identifying a user of the projection apparatus.

Background Art

In recent years, a technique in which a two-dimensional code for authentication is provided in advance when a registration procedure of a user is completed has been proposed as an existing technique relating to a personal confirmation at the time of entry into any facility or payment. In such a technique, a personal confirmation of the user is performed by causing an authentication device to read the two-dimensional code provided in advance.

For example, Patent Literature 1 discloses a technique in which a two-dimensional code displayed on an authentication device is temporarily read using an authentication application on a mobile device, the mobile device decodes the two-dimensional code and adds necessary information thereto to create and display a new two-dimensional code, and the authentication device reads the new two-dimensional code, so that a personal confirmation is performed.

CITATION LIST

Patent Literature

Patent Literature 1: Japanese Patent Application Laid-open No. 2016-038706

DISCLOSURE OF INVENTION

Technical Problem

However, in the technique described in Patent Literature 1, a dedicated reader is required to read the two-dimensional code displayed on the mobile device, and the technique lacks versatility.

In view of the above circumstances, the present technology makes it possible to easily perform a personal confirmation of a user even without a dedicated reader to read a two-dimensional code, for example.

Solution to Problem

In order to solve the above problem, a projection apparatus according to an embodiment of the present technology includes a control unit and a projection unit.

The control unit generates a data pattern on the basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus.

The projection unit projects an identifier based on the data onto a projection target.

The control unit may generate a data pattern on the basis of the first characteristic value, the second characteristic value, the count value, and position information of the projection apparatus or a random number value generated in the projection apparatus, and generate data in which the data pattern and the first characteristic value are combined, and the projection unit may project an identifier based on the data onto the projection target.

The control unit may apply at least the first characteristic value, the second characteristic value, and the count value to a pattern generation function for encrypting at least the first characteristic value, the second characteristic value, and the count value, and generate a data pattern.

The control unit may increment the count value each time the projection apparatus projects the identifier.

The control unit may vary the data in which the data pattern and the first characteristic value are combined, each time the projection unit projects the identifier.

The control unit may generate a data pattern on the basis of the first characteristic value, the second characteristic value, and the incremented count value, and generate data in which the data pattern and the first characteristic value are combined, and the projection unit may project an identifier based on the data onto the projection target.

The projection unit may project a two-dimensional code as the identifier.

In order to solve the above problem, a projection system according to an embodiment of the present technology includes a projection apparatus, a terminal device, and a server.

The projection apparatus includes a control unit and a projection unit.

The control unit generates a data pattern on the basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus.

The projection unit projects an identifier based on the data onto a projection target.

The terminal device reads the identifier and acquires the data.

The server acquires the data from the terminal device and executes analysis processing of the data.

The control unit may generate a data pattern on the basis of the first characteristic value, the second characteristic value, the count value, and position information of the projection apparatus or a random number value generated in the projection apparatus, and generates data in which the data pattern and the first characteristic value are combined.

The projection unit may project an identifier based on the data onto the projection target.

The control unit may apply at least the first characteristic value, the second characteristic value, and the count value to a pattern generation function for encrypting at least the first characteristic value, the second characteristic value, and the count value, and generate a data pattern.

The server may store data in which the first characteristic value, the second characteristic value, and an initial value of the count value are combined, and extract the initial value of the count value from the data by referring to the first characteristic value combined with the data pattern acquired from the terminal device.

The server may execute decoding processing of decoding the data pattern as the analysis processing.

The server may apply the data pattern acquired from the terminal device and the initial value of the count value to the pattern generation function and calculate at least a value corresponding to the first characteristic value.

The server may increment the initial value of the count value if the first characteristic value combined with the data pattern acquired from the terminal device and the value corresponding to the first characteristic value are not matched.

The server may apply the data pattern acquired from the terminal device and the incremented initial value to the pattern generation function, execute arithmetic processing of calculating at least the value corresponding to the first characteristic value, and repeat the arithmetic processing while incrementing the initial value of the count value until the first characteristic value combined with the data pattern acquired from the terminal device and the value corresponding to the first characteristic value are matched.

The server may determine that the data pattern is decoded when the first characteristic value combined with the data pattern acquired from the terminal device and the value corresponding to the first characteristic value and calculated by the arithmetic processing are matched, and may output decoded data to the terminal device.

In order to solve the above problem, a projection method for a projection apparatus according to an embodiment of the present technology includes: generating a data pattern on the basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus; generating data in which the data pattern and the first characteristic value are combined; and projecting an identifier based on the data onto a projection target.

In order to solve the above problem, a program according to an embodiment of the present technology causes a projection apparatus to execute the following steps: generating a data pattern on the basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus; generating data in which the data pattern and the first characteristic value are combined; and projecting an identifier based on the data onto a projection target.

MODE(S) FOR CARRYING OUT THE INVENTION

Figure 1:
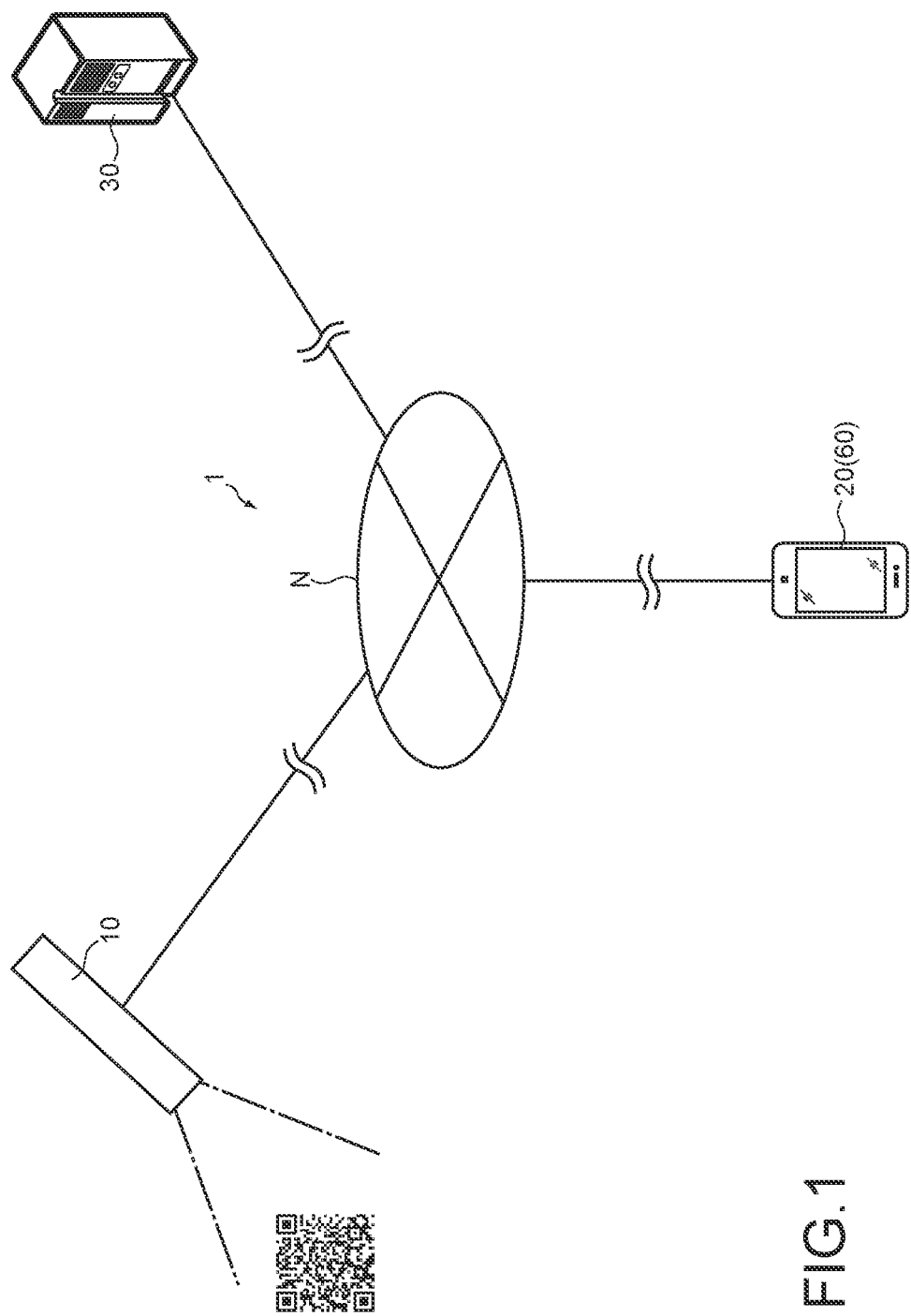
FIG. 1 is a system diagram showing a hardware configuration example of a projection system according to the present technology.

Hereinafter, an embodiment of the present technology will be described with reference to the drawings.
<Hardware Configuration of Projection System>
FIG. 1 is a system diagram showing a hardware configuration example of a projection system 1 according to this embodiment. As shown in FIG. 1, the projection system 1 includes a projection apparatus 10, a terminal device 20 (terminal device 60), and an authentication server 30. The projection apparatus 10, the terminal device 20 (terminal device 60), and the authentication server 30 are communicably connected to each other via a network N.

[Projection Apparatus]

The projection apparatus 10 is a device capable of encrypting characteristic information of the projection apparatus 10, which is stored in an IC chip 104, converting the encrypted data into image data, and projecting the image data onto any projection target.

Figure 2:
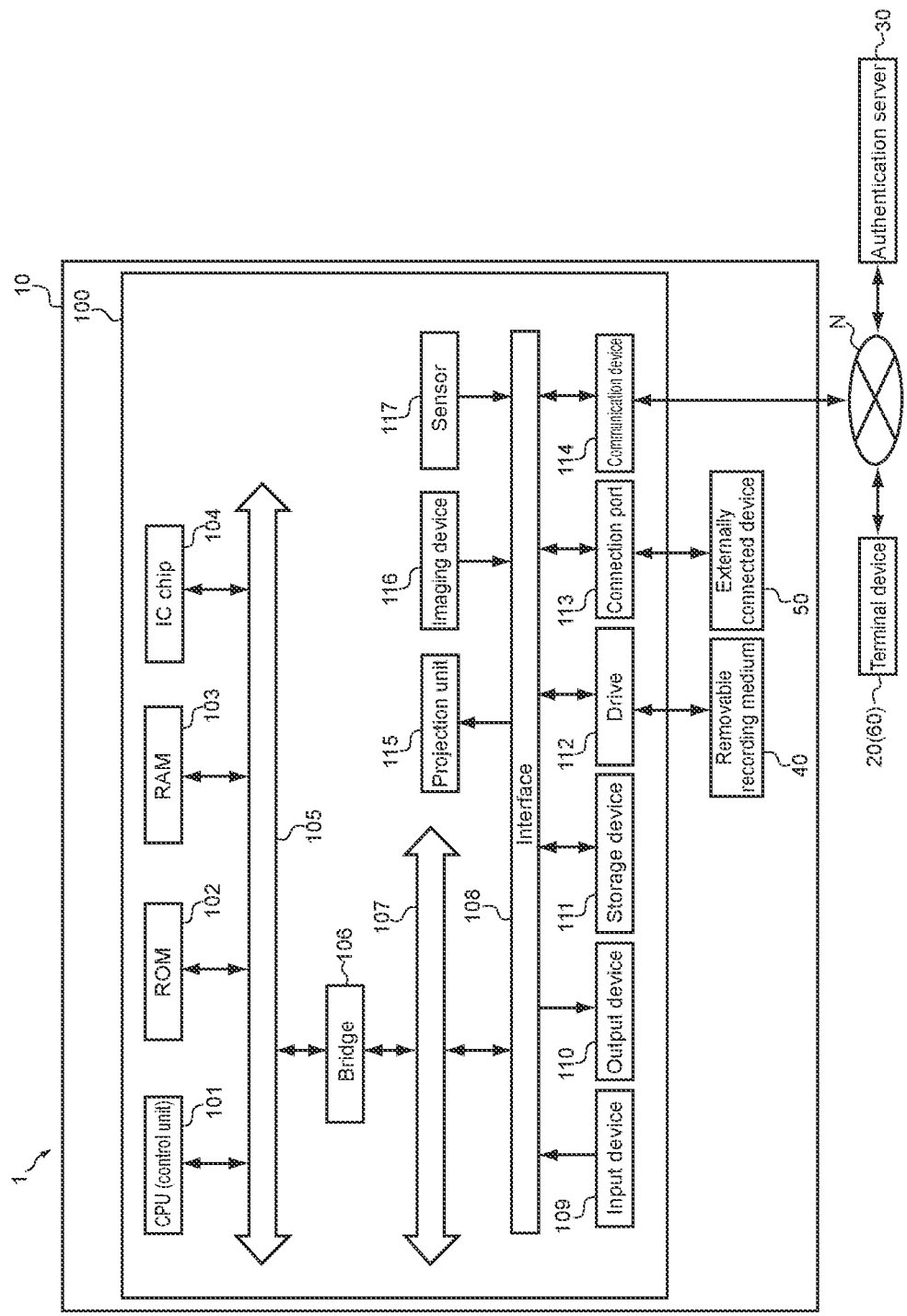
FIG. 2 is a block diagram showing a hardware configuration example of a projection apparatus of the projection system.

FIG. 2 is a block diagram showing a hardware configuration example of the projection apparatus 10 according to this embodiment. As shown in FIG. 2, the projection apparatus 10 includes an information processing device 100. Hereinafter, the configuration of the information processing device 100 will be described in detail.

The information processing device 100 includes a central processing unit (CPU) 101, a read only memory (ROM) 102, a random access memory (RAM) 103, the IC chip 104, an input device 109, a communication device 114, a projection unit 115, and a sensor 117. The CPU 101 is an example of a "control unit" in the Claims.

Further, the information processing device 100 may have a configuration including a host bus 105, a bridge 106, an external bus 107, an interface 108, an output device 110, a storage device 111, a drive 112, and a connection port 113.

Moreover, the information processing device 100 may include a processing circuit such as a digital signal processor (DSP), an application specific integrated circuit (ASIC), or a field-programmable gate array (FPGA) instead of or together with the CPU 101.

The CPU 101 functions as an arithmetic processing unit and a control unit, and controls the overall operation of the information processing device 100 or a part thereof in accordance with various programs recorded in the ROM 102, the RAM 103, the storage device 111, or a removable recording medium 40.

The ROM 102 stores programs and arithmetic parameters to be used by the CPU 101. The RAM 103 temporarily stores programs to be used in the execution of the CPU 101, parameters that appropriately change in the execution of the program, and the like. The CPU 101, the ROM 102, and the RAM 103 are interconnected by the host bus 105 configured by an internal bus such as a CPU bus. Further, the host bus 105 is connected to the external bus 107 such as a peripheral component interconnect/interface (PCI) bus via the bridge 106.

The IC chip 104 is an integrated circuit having electronic elements such as transistors, resistors, capacitors, and diodes. The IC chip 104 of this embodiment stores values A, B, and C and count values. The values A, B, and C are characteristic values of the projection apparatus 10.

Here, the value A is a characteristic value stored in the IC chip 104 at the time of manufacturing the projection apparatus 10, and is a characteristic value linked to the projection apparatus 10. Examples of the value A include a serial number of the projection apparatus 10. The value A is initially registered in the authentication server 30 via the terminal device 20. The value A is an example of a "first characteristic value" in the Claims.

Further, the value B is a characteristic value individually set by the user of the projection apparatus 10, and is stored in the IC chip 104. The value B is, for example, an authentication code such as a PIN code. The value B is initially registered in the authentication server 30 via the terminal device 20. The value B is an example of a "second characteristic value" in the Claims.

Furthermore, the value C is sensor data detected by the sensor 117 mounted on the projection apparatus 10 and is stored in the IC chip 104. The value C is, for example, the position information of the projection apparatus 10 detected by a global positioning system (GPS) sensor (sensor 117). Alternatively, the value C may be a random number value generated in the projection apparatus 10.

In addition, the count value is a value based on the number of times the user presses a switch (input device 109) (the number of times of projection of the projection apparatus 10), and is individually managed by the projection apparatus 10 and the authentication server 30. The count value is initially registered in the authentication server 30 from the projection apparatus 10 via the terminal device 20. Note that the definitions of the above-mentioned values A, B, and C and count values are the same in the following description.

The input device 109 is a device to be operated by a user, such as a mouse, a keyboard, a touch panel, a button, a switch, or a lever, and is typically a switch. The input device 109 may be, for example, a remote control device using infrared or other radio waves, or an external connection device corresponding to the operation of the projection apparatus 10.

The input device 109 includes an input control circuit that generates input signals on the basis of information input by the user and outputs the generated input signals to the CPU 101. The user operates the input device 109 to input various types of data to the projection apparatus 10 or instructs the input device 109 to perform a processing operation.

The communication device 114 is, for example, a communication interface configured by a communication device for connection to the network N. The communication device 114 may be, for example, a communication card for a local area network (LAN), Bluetooth (registered trademark), Wi-Fi (registered trademark), or a wireless USB (WUSB).

Further, the communication device 114 may be a router for optical communication, a router for asymmetric digital subscriber line (ADSL), or modems for various types of communication. The communication device 114 transmits and receives signals and the like to and from the Internet or other communication devices by using predetermined protocols such as TCP/IP. Further, the network N connected to the communication device 114 is a network connected by wire or wirelessly, and may include, for example, the Internet, a home LAN, infrared communication, radio wave communication, or satellite communication.

The projection unit 115 converts the data obtained by encrypting the characteristic information of the projection apparatus 10 into image data, and projects the image data onto any projection target. As a result, the image in which the characteristic information of the projection apparatus 10 is encrypted is projected onto the projection target. The image is typically, but not limited to, an identifier such as a QR code (registered trademark), and may be a two-dimensional code such as a bar code.

The projection unit 115 of this embodiment projects an image by a projection method similar to that of a projector. In this case, the projection method is typically a light emitting diodes (LED) method, but is not limited thereto. For example, a digital light processing (DLP) method or a liquid crystal method may be employed. Further, the light source included in the projection unit 115 is typically an LED light source, but is not limited thereto and may be any type of light source such as an incandescent lamp, a halogen lamp, or a fluorescent lamp.

The sensor 117 is, for example, a variety of sensors such as an acceleration sensor, an angular velocity sensor, a geomagnetic sensor, an illuminance sensor, a temperature sensor, a barometric sensor, and a sound sensor (microphone), and is typically a global positioning system (GPS) sensor that receives a GPS signal and measures the latitude, longitude, and altitude of the projection apparatus 10.

Further, the sensor 117 may acquire, for example, information regarding the state of the projection apparatus 10 itself, such as the posture of the housing of the projection apparatus 10, or information regarding the peripheral environment of the projection apparatus 10, such as the brightness and sound of the periphery of the projection apparatus 10.

The output device 110 is configured by a device capable of notifying the user of the acquired information by using senses such as a sense of vision, a sense of hearing, and a sense of touch. The output device 110 may be, for example, a display device such as a liquid crystal display (LCD) or an organic electro-luminescence (EL) display, a sound output device such as a speaker or headphones, or a vibrator. The output device 110 outputs the result acquired by the processing of the information processing device 100 as a video such as a text or an image, a sound such as voice or audio, or vibration.

The storage device 111 is a data storage device configured as an example of a storage unit of the information processing device 100. The storage device 111 is configured by, for example, a magnetic storage device such as a hard disk drive (HDD), a semiconductor storage device, an optical storage device, or a magneto-optical storage device. The storage device 111 stores, for example, programs to be executed by the CPU 101, various types of data, and various types of data acquired from the outside.

The drive 112 is a reader/writer for the removable recording medium 40 such as a magnetic disk, an optical disc, a magneto-optical disk, or a semiconductor memory, and is built in or externally attached to the projection apparatus 10. The drive 112 reads the information recorded on the removable recording medium 40 mounted thereon, and outputs the read information to the RAM 103. Further, the drive 112 writes a record on the removable recording medium 40 mounted thereon.

The connection port 113 is a port for connecting a device to the information processing device 100. The connection port 113 may be, for example, a universal serial bus (USB) port, an IEEE1394 port, or a small computer system interface (SCSI) port. Further, the connection port 113 may be an RS-232C port, an optical audio terminal, a high-definition multimedia interface (HDMI) (registered trademark) port, or the like. An externally connected device 50 is connected to the connection port 113, and thus various types of data are output from the externally connected device 50 to the information processing device 100.

Figure 3:
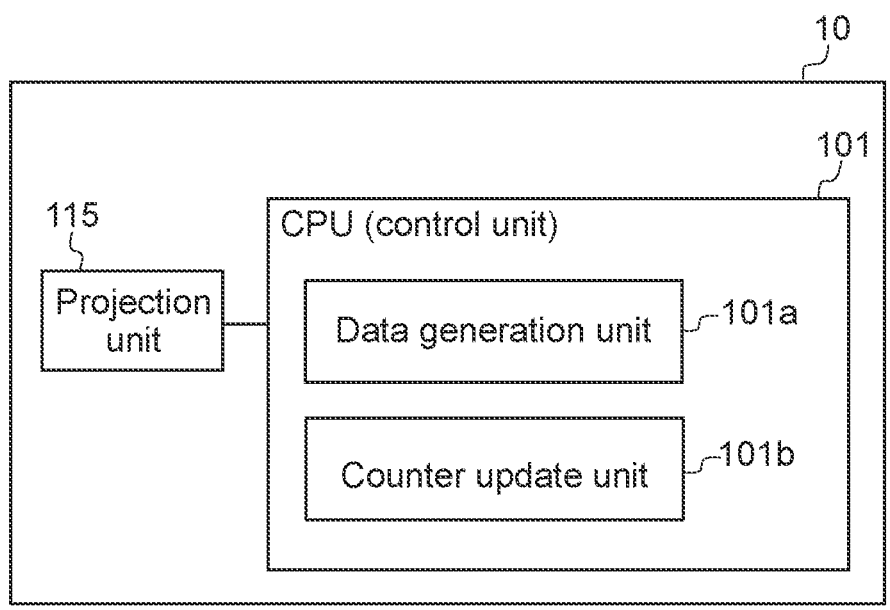
FIG. 3 is a functional block diagram showing a configuration example of the projection apparatus.

FIG. 3 is a functional block diagram showing a configuration example of the projection apparatus 10. The CPU 101 functionally includes a data generation unit 101a and a counter update unit 101b.

The data generation unit 101a reads the characteristic information of the projection apparatus 10 stored in the IC chip 104, and encrypts that information. Thus, one-time data (data pattern) in which the information is encrypted is generated.

The counter update unit 101b manages a count value stored in the IC chip 104 on the basis of the output of the input device 109. For example, the counter update unit 101b rewrites the count value.

[Terminal Device]

The terminal device 20 (terminal device 60) reads an image (identifier), in which the characteristic information of the projection apparatus 10 is encrypted and which is projected onto any projection target, and outputs the read information to the authentication server 30. In this case, the communication standard for reading the image is typically near field radio communication (NFC), but is not limited thereto. For example, ISO/IEC7816, ISO/IEC10536, ISO/IEC14443, ISO/IEC18092, ISO/IEC15693, remote contactless communication using microwaves, infrared communication, IEEE802.11a/b/g/n (Wi-Fi (registered trademark)), Bluetooth (registered trademark), or the like may be used, and the type thereof is not limited.

The terminal device 20 is, for example, a terminal handled by the user of the projection apparatus 10, and a terminal device 60 is a terminal handled by another user who is not the user of the projection apparatus 10. The terminal device 20 (terminal device 60) is, for example, a mobile terminal, a wearable device, or a personal computer (Personal Computer), and is typically a mobile terminal.

The mobile terminal is, for example, a smart phone, a mobile phone terminal, or a tablet terminal. The wearable device is, for example, a head-mounted display (HMD), smart glasses, a smart watch, a smart band, or smart earphones.

[Authentication Server]

Figure 4:
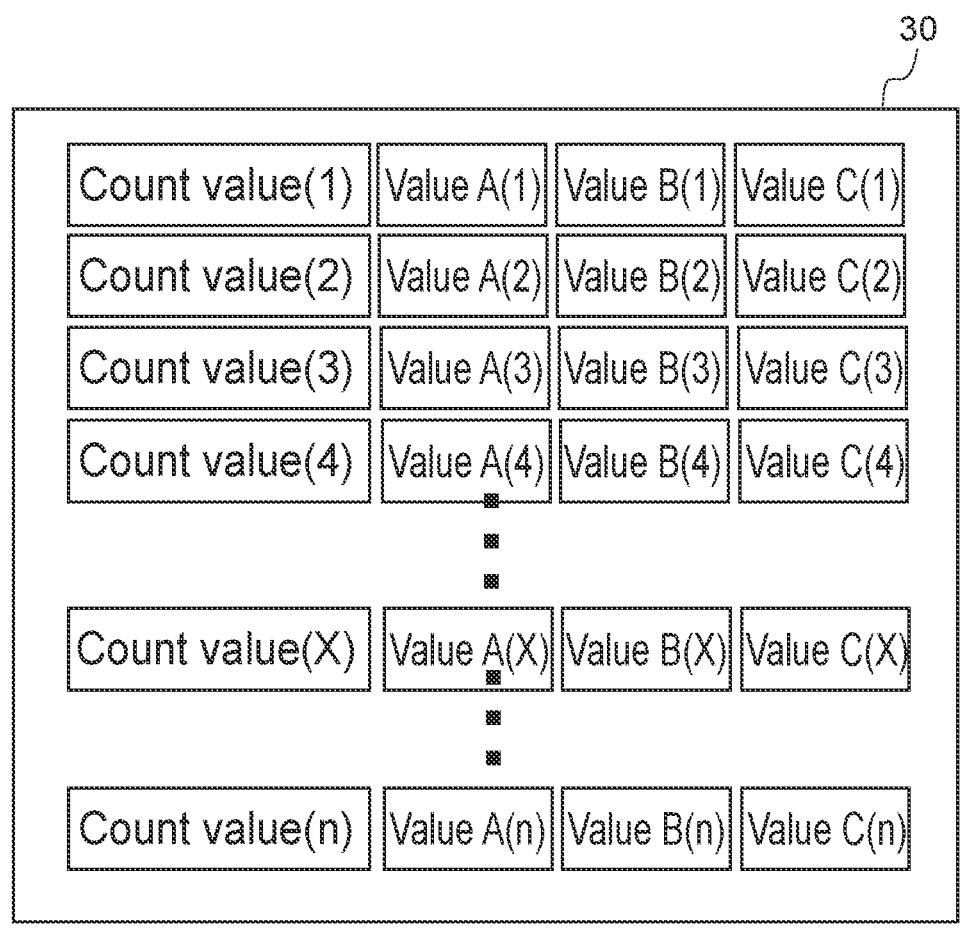
FIG. 4 is a conceptual diagram showing a data structure managed in an authentication server of the projection system.

FIG. 4 is a conceptual diagram showing a data structure managed in the authentication server 30. The authentication server 30 acquires values A, B, and C and count values from the projection apparatus 10 via the terminal device 20, and stores those values in a combined state.

Here, as shown in FIG. 4, the authentication server 30 stores data obtained by combining the values A, B, and C and the count value for each of a plurality of projection apparatuses. The authentication server 30 of this embodiment executes analysis processing of decoding a data pattern in which the data including the values A, B, and C and the count value is encrypted, and outputs the result to the terminal device 20 (terminal device 60). Note that the authentication server 30 is an example of the "server" in the Claims.

Hereinabove, the example of the hardware configuration of the projection system 1 has been described. Each of the above components may be configured using a general-purpose member, or may be configured by hardware specific to the function of each component. Such a configuration may be changed as appropriate depending on the technical level at the time of implementation.

<Operation of Projection Apparatus System>

Figure 5:
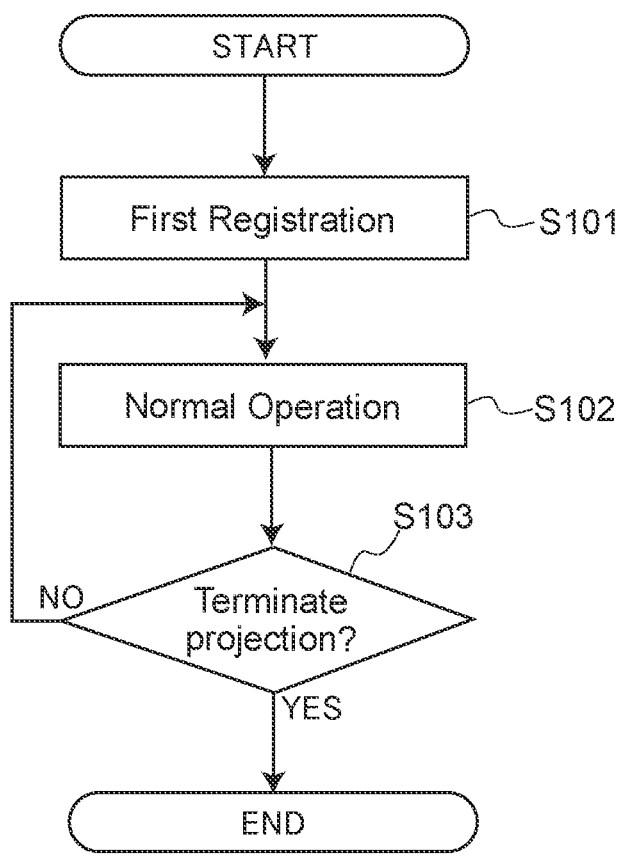
FIG. 5 is a flowchart showing an operation of the projection system.

FIG. 5 is a flow chart showing a flow of a typical operation of the projection system 1. Hereinafter, the operation of the projection system 1 will be described with reference to FIG. 5 as appropriate.

[Step S101: First Registration]

Figure 6:
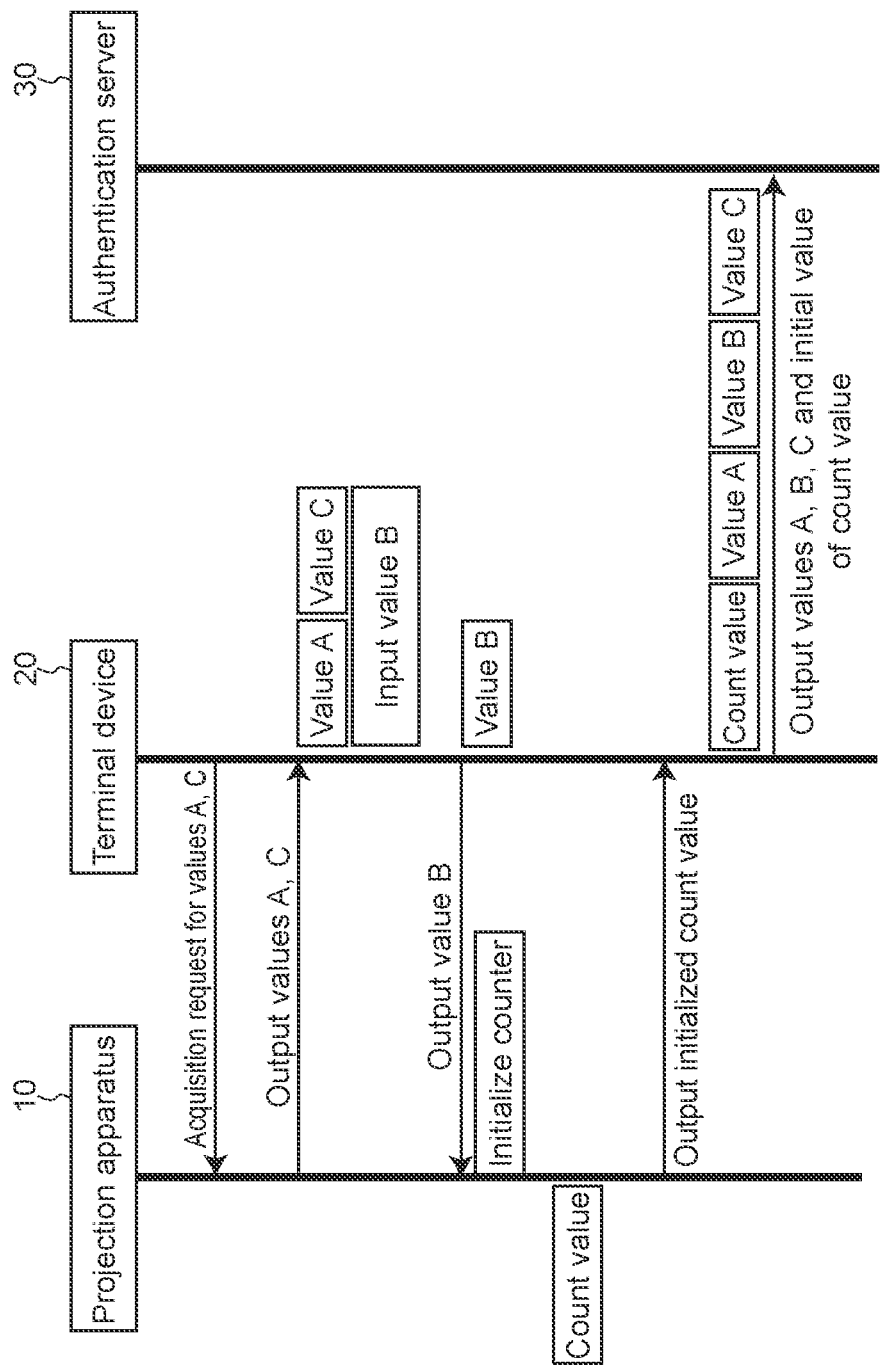
FIG. 6 is a sequence diagram showing in detail one step of the operation of the projection system.

FIG. 6 is a sequence diagram showing details of Step S101. First, the terminal device 20 outputs an acquisition request for acquiring the values A and C to the projection apparatus 10. Upon receiving the acquisition request from the terminal device 20, the projection apparatus 10 reads the values A and C stored in the IC chip 104, and outputs these values to the terminal device 20.

Next, the user of the projection apparatus 10 inputs the value B to the terminal device 20 that has acquired the values A and C. The terminal device 20 to which the value B is input outputs the value B to the projection apparatus 10. As a result, the value B is stored in the IC chip 104 of the projection apparatus 10.

Next, in the projection apparatus 10 that has acquired the value B, the count value stored in the IC chip 104 is initialized by the counter update unit 101b. The projection apparatus 10 then outputs the initialized count value to the terminal device 20.

The terminal device 20 that has acquired the initial value of the count value from the projection apparatus 10 combines this initial value with the previously acquired values A, B, and C, and outputs them to the authentication server 30. Thus, registration data in which the initial value of the count value and the values A, B, and C are combined is registered in the authentication server 30 (see FIG. 4).

[Step S102: Normal Operation]

Figure 7:
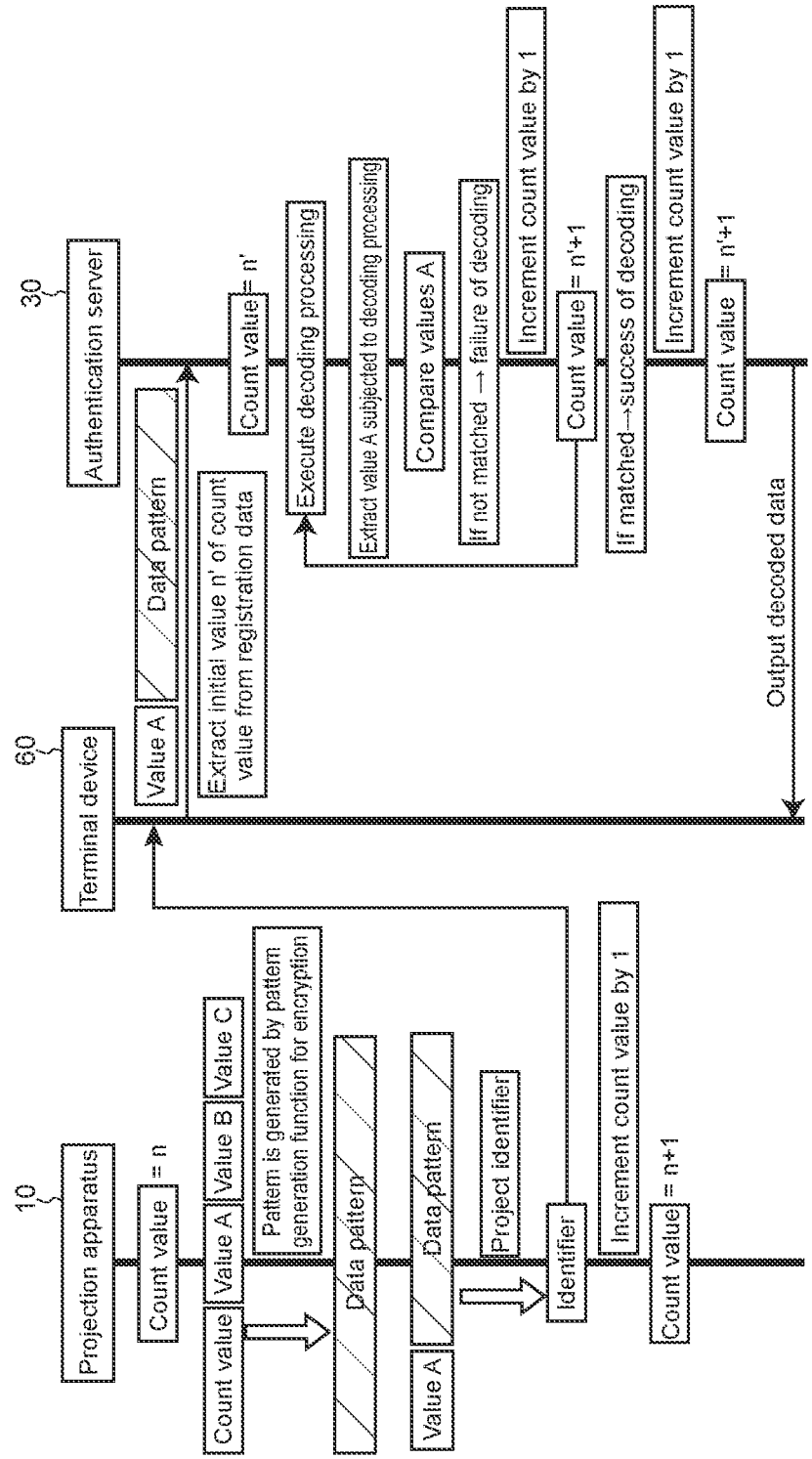
FIG. 7 is a sequence diagram showing in detail one step of the operation of the projection system.

FIG. 7 is a sequence diagram showing details of Step S102. First, the user of the projection apparatus 10 presses the switch (input device 109) of the projection apparatus 10. The data generation unit 101a reads the values A, B, and C and count value stored in the IC chip 104 on the basis of the output of the input device 109, and combines these values to generate a data pattern.

Specifically, the data generation unit 101a applies the values A, B, and C and count value read from the IC chip 104 to a pattern generation function for encrypting these values to generate a data pattern. Note that in this embodiment the pattern generation function is not particularly limited and can be regarded as a general program for encrypting the values A, B, and C and the count value.

Next, the data generation unit 101a combines the value A with a data pattern, in which data obtained by combining the values A, B, and C with the count value is encrypted. The data generation unit 101a then outputs the data obtained by combining the value A with the data pattern to the projection unit 115.

The projection unit 115 converts the data acquired from the data generation unit 101a, in which the data pattern and the value A are combined, into image data, and projects the image data onto any projection target. As a result, an identifier, which is an image in which the values A, B, and C and the count value are encrypted, is projected onto the projection target. At this time, the counter update unit 101b increments the count value stored in the IC chip 104 by 1.

Subsequently, the terminal device 60 reads the pattern of the identifier projected on any projection target. Thus, the terminal device 60 acquires data in which the data pattern and the value A are combined, and outputs the data to the authentication server 30.

The authentication server 30 that has acquired from the terminal device 60 the data in which the data pattern and the value A are combined refers to the value A to determine the registration data of the projection apparatus 10 registered in the previous Step 101 from among a large number of pieces of data stored for each of a plurality of projection apparatuses (see FIG. 4). The authentication server 30 then extracts the initial value of the count value from the registration data in which the values A, B, and C and the initial value of the count value are combined.

Next, the authentication server 30 executes the processing of decoding the data pattern acquired from the terminal device 60. Specifically, the authentication server 30 inversely calculates values A', B', and C' by applying the data pattern acquired from the terminal device 60 and the initial value of the extracted count value to the pattern generation function used in generating the data pattern. The values A', B', and C' calculated by this arithmetic processing are values corresponding to the values A, B, and C, respectively.

Next, the authentication server 30 compares the value A combined with the data pattern acquired from the terminal device 60 and the value A', and if they are not matched, increments the initial value of the count value extracted from the registration data of the projection apparatus 10 by 1. The authentication server 30 then applies the initial value incremented by 1 and the data pattern to the pattern generation function again, and inversely calculates the values A', B', and C' anew.

The authentication server 30 of this embodiment repeatedly executes the arithmetic processing described above while incrementing the initial value of the count value by 1 until the value A combined with the data pattern acquired from the terminal device 60 and the value A' coincide with each other.

On the other hand, if the value A combined with the data pattern matches the value A' as a result of the arithmetic processing described above, the authentication server 30 determines that the data pattern acquired from the terminal device 60 has been decoded. In other words, it is determined that not only the value A' matched with the value A, but also the values B' and C' calculated together in the arithmetic processing in which the value A' is calculated are also true values. The authentication server 30 then outputs, to the terminal device 60, these values A', B', and C' as data for which the data pattern is decoded (values A, B, and C).

Thus, the terminal device 60 acquires the value A, B, and C that are the characteristic information of the projection apparatus 10. At this time, since the characteristic information of the projection apparatus 10, which is basically known by only the user of the projection apparatus 10, is displayed on the terminal device 60, for example, the owner of the terminal device 60 can confirm the values A, B, and C with the owner of the projection apparatus 10 and thus easily confirm whether the owner is the real user of the projection apparatus 10.

[Step S103: Terminate Projection?]

When the user presses the switch (input device 109) of the projection apparatus 10 again (Yes in Step S103), the previous Step 102 is executed again. In this embodiment, each time the user presses the switch (input device 109) of the projection apparatus 10, the previous step S102 is repeatedly executed. At this time, the count value stored in the IC chip 104 is rewritten to a count value incremented by 1 each time the user presses the switch (input device 109).

Therefore, the data generation unit 101*a* generates a new data pattern on the basis of the count value incremented by 1 with respect to the previous projection operation and the values A, B, and C, and newly generates data in which such a data pattern and the value A are combined. In other words, the projection unit 115 projects a different identifier onto the projection target each time the user presses the switch (input device 109).

As a result, since the identifier projected onto the projection target changes for each projection operation of the projection apparatus 10, for example, this suppresses the identifier from being captured and the characteristic information of the projection apparatus 10 from being secondarily used by someone other than the user.

Modifications

Although the embodiment of the present technology has been described above, the present technology is not limited to the embodiment described above, and of course various modifications may be made thereto.

For example, in the above embodiment, the data pattern is generated by encrypting the data in which the values A, B, and C are combined with the count value, but the data pattern is not limited to this. The value C may be omitted as necessary.

Further, in the above embodiment, the authentication server 30 executes the arithmetic processing of decoding the data pattern acquired from the terminal device 60, but the present technology is not limited to this. For example, the authentication server 30 may decode the data pattern acquired from the terminal device 60 by directly referring to the registration data of the projection apparatus 10.

Supplement

The embodiment of the present technology may include, for example, a projection apparatus as described above, a projection system, a projection method to be performed in a projection apparatus or projection system, a program for causing the projection apparatus to function, and a non-transitory, tangible medium on which the program is recorded.

Further, although the projection system 1 of this embodiment has been described on the assumption that a personal confirmation of the user of the projection apparatus 10 is performed, the present technology is not limited thereto. The application of the present technology is not particularly limited.

In addition, the effects described herein are illustrative or exemplary only and not restrictive. In other words, the present technology may provide other effects apparent to those skilled in the art from the description herein, in addition to or instead of the effects described above.

Although the suitable embodiment of the present technology has been described in detail above with reference to the accompanying drawings, the present technology is not limited to such an example. It is clear that persons who have common knowledge in the technical field of the present technology could conceive various alterations or modifications within the scope of the technical idea described in the Claims. It is understood that of course such alterations or modifications also fall under the technical scope of the present technology.

Note that the present technology can have the following configurations.

(1) A projection apparatus, including:
a control unit that generates a data pattern on the basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus; and
a projection unit that projects an identifier based on the data onto a projection target.

(2) The projection apparatus according to (1), in which
the control unit generates a data pattern on the basis of the first characteristic value, the second characteristic value, the count value, and position information of the projection apparatus or a random number value generated in the projection apparatus, and generates data in which the data pattern and the first characteristic value are combined, and
the projection unit projects an identifier based on the data onto the projection target.

(3) The projection apparatus according to (1) or (2), in which
the control unit applies at least the first characteristic value, the second characteristic value, and the count value to a pattern generation function for encrypting at least the first characteristic value, the second characteristic value, and the count value, and generates a data pattern.

(4) The projection apparatus according to any one of (1) to (3), in which
the control unit increments the count value each time the projection apparatus projects the identifier.

(5) The projection apparatus according to (4), in which
the control unit varies the data in which the data pattern and the first characteristic value are combined, each time the projection unit projects the identifier.

(6) The projection apparatus according to (4) or (5), in which
the control unit generates a data pattern on the basis of the first characteristic value, the second characteristic value, and the incremented count value, and generates data in which the data pattern and the first characteristic value are combined, and
the projection unit projects an identifier based on the data onto the projection target.

(7) The projection apparatus according to any one of (1) to (6), in which
the projection unit projects a two-dimensional code as the identifier.

(8) A projection system, including:
a projection apparatus including
a control unit that generates a data pattern on the basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus, and
a projection unit that projects an identifier based on the data onto a projection target;
a terminal device that reads the identifier and acquires the data; and
a server that acquires the data from the terminal device and executes analysis processing of the data.

(9) The projection system according to (8), in which
the control unit generates a data pattern on the basis of the first characteristic value, the second characteristic value, the count value, and position information of the projection apparatus or a random number value generated in the projection apparatus, and generates data in which the data pattern and the first characteristic value are combined, and
the projection unit projects an identifier based on the data onto the projection target.

(10) The projection system according to (8) or (9), in which
the control unit applies at least the first characteristic value, the second characteristic value, and the count value to a pattern generation function for encrypting at least the first characteristic value, the second characteristic value, and the count value, and generates a data pattern.

(11) The projection system according to (10), in which
the server stores data in which the first characteristic value, the second characteristic value, and an initial value of the count value are combined, and extracts the initial value of the count value from the data by referring to the first characteristic value combined with the data pattern acquired from the terminal device.

(12) The projection system according to (11), in which
the server executes decoding processing of decoding the data pattern as the analysis processing.

(13) The projection system according to (11) or (12), in which
the server applies the data pattern acquired from the terminal device and the initial value of the count value to the pattern generation function and calculates at least a value corresponding to the first characteristic value.

(14) The projection system according to (13), in which
the server increments the initial value of the count value if the first characteristic value combined with the data pattern acquired from the terminal device and the value corresponding to the first characteristic value are not matched.

(15) The projection system according to (14), in which
the server applies the data pattern acquired from the terminal device and the incremented initial value to the pattern generation function, executes arithmetic processing of calculating at least the value corresponding to the first characteristic value, and repeats the arithmetic processing while incrementing the initial value of the count value until the first characteristic value combined with the data pattern acquired from the terminal device and the value corresponding to the first characteristic value are matched.

(16) The projection system according to (15), in which
the server determines that the data pattern is decoded when the first characteristic value combined with the data pattern acquired from the terminal device and the value corresponding to the first characteristic value and calculated by the arithmetic processing are matched, and outputs decoded data to the terminal device.

(17) A projection method, including:
by a projection apparatus, generating a data pattern on the basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus;

generating data in which the data pattern and the first characteristic value are combined; and projecting an identifier based on the data onto a projection target.

(18) A program causing a projection apparatus to executes the steps of:

generating a data pattern on the basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus;

generating data in which the data pattern and the first characteristic value are combined; and projecting an identifier based on the data onto a projection target.

REFERENCE SIGNS LIST projection system 1
projection apparatus 10
terminal device 20, 60
authentication server 30
CPU (control unit) 101
projection unit 115
data generation unit 101a
counter update unit 101b
IC chip 104

The invention claimed is:

1. A projection apparatus, comprising:

a control unit that generates a data pattern on a basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus; and a projection unit that projects an identifier based on the data onto a projection target, wherein the control unit is implemented via at least one processor.

2. The projection apparatus according to claim 1, wherein the control unit generates a data pattern on a basis of the first characteristic value, the second characteristic value, the count value, and position information of the projection apparatus or a random number value generated in the projection apparatus, and generates data in which the data pattern and the first characteristic value are combined, and the projection unit projects an identifier based on the data onto the projection target.

3. The projection apparatus according to claim 2, wherein the control unit applies at least the first characteristic value, the second characteristic value, and the count value to a pattern generation function for encrypting at least the first characteristic value, the second characteristic value, and the count value, and generates a data pattern.

4. The projection apparatus according to claim 2, wherein the control unit increments the count value each time the projection apparatus projects the identifier.

5. The projection apparatus according to claim 4, wherein the control unit varies the data in which the data pattern and the first characteristic value are combined, each time the projection unit projects the identifier.

6. The projection apparatus according to claim 5, wherein the control unit generates a data pattern on a basis of the first characteristic value, the second characteristic value, and the incremented count value, and generates data in which the data pattern and the first characteristic value are combined, and the projection unit projects an identifier based on the data onto the projection target.

7. The projection apparatus according to claim 1, wherein the projection unit projects a two-dimensional code as the identifier.

8. A projection system, comprising:

a projection apparatus including
 a control unit that generates a data pattern on a basis of a first characteristic value, a second characteristic value, and a count value and generates data in which the data pattern and the first characteristic value are combined, the first characteristic value being a characteristic value linked to the projection apparatus, the second characteristic value being a value set by a user of the projection apparatus, the count value being based on the number of times of projection of the projection apparatus, and
 a projection unit that projects an identifier based on the data onto a projection target;

a terminal device that reads the identifier and acquires the data; and a server that acquires the data from the terminal device and executes analysis processing of the data, wherein the control unit is implemented via at least one processor.

9. The projection system according to claim 8, wherein the control unit generates a data pattern on a basis of the first characteristic value, the second characteristic value, the count value, and position information of the projection apparatus or a random number value generated in the projection apparatus, and generates data in which the data pattern and the first characteristic value are combined, and the projection unit projects an identifier based on the data onto the projection target.

10. The projection system according to claim 9, wherein the control unit applies at least the first characteristic value, the second characteristic value, and the count value to a pattern generation function for encrypting at least the first characteristic value, the second characteristic value, and the count value, and generates a data pattern.

11. The projection system according to claim 10, wherein the server stores data in which the first characteristic value, the second characteristic value, and an initial value of the count value are combined, and extracts the initial value of the count value from the data by referring to the first characteristic value combined with the data pattern acquired from the terminal device.

12. The projection system according to claim 11, wherein the server executes decoding processing of decoding the data pattern as the analysis processing.

13. The projection system according to claim 12, wherein the server applies the data pattern acquired from the terminal device and the initial value of the count value to the pattern generation function and calculates at least a value corresponding to the first characteristic value.

14. The projection system according to claim 13, wherein the server increments the initial value of the count value if the first characteristic value combined with the data pattern acquired from the terminal device and the value corresponding to the first characteristic value are not matched.

15. The projection system according to claim 14, wherein the server applies the data pattern acquired from the terminal device and the incremented initial value to the pattern generation function, executes arithmetic processing of calculating at least the value corresponding to the first characteristic value, and repeats the arithmetic processing while incrementing the initial value of the count value until the first characteristic value combined with the data pattern acquired from the terminal device and the value corresponding to the first characteristic value are matched.

16. The projection system according to claim 15, wherein the server determines that the data pattern is decoded when the first characteristic value combined with the data pattern acquired from the terminal device and the value corresponding to the first characteristic value and calculated by the arithmetic processing are matched, and outputs decoded data to the terminal device.

17. A projection method, comprising:
by a projection apparatus,
generating a data pattern on a basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus;
generating data in which the data pattern and the first characteristic value are combined; and
projecting an identifier based on the data onto a projection target.

18. A non-transitory computer-readable medium having embodied thereon a program, which when executed by at least one processor of a projection apparatus causes the projection apparatus to execute a method, the method comprising:
generating a data pattern on a basis of a first characteristic value, a second characteristic value, and a count value, the first characteristic value being a characteristic value linked to the projection apparatus, the second characteristic value being a value set by a user of the projection apparatus, the count value being based on the number of times of projection of the projection apparatus;
generating data in which the data pattern and the first characteristic value are combined; and
projecting an identifier based on the data onto a projection target.

* * * * *